United States Patent [19]

Wilson

[11] Patent Number: 4,630,386
[45] Date of Patent: Dec. 23, 1986

[54] REVERSIBLE PICTURE FRAME

[76] Inventor: Arthur K. Wilson, 87 Laurentide Drive, Don Mills, Ontario, Canada, M3A 3E3

[21] Appl. No.: 770,496

[22] Filed: Aug. 29, 1985

[51] Int. Cl.$^4$ .............................................. G09F 1/00
[52] U.S. Cl. ........................................ 40/155; 403/403
[58] Field of Search .................... 40/10, 16, 155, 152, 40/152.1, 490

[56] References Cited

U.S. PATENT DOCUMENTS

| | | | |
|---|---|---|---|
| 2,900,750 | 8/1959 | Buelow | 40/152.1 |
| 3,312,008 | 4/1967 | Yarder | 40/155 |
| 3,883,974 | 5/1975 | Ashton | 40/152 |
| 3,955,298 | 5/1976 | Kapstad | 40/152 |
| 4,149,331 | 4/1979 | Prager | 40/16 |
| 4,475,300 | 10/1984 | Ledenican | 40/490 |
| 4,559,733 | 12/1985 | Forslund | 40/10 R |

*Primary Examiner*—Robert Peshock
*Assistant Examiner*—Wenceslao J. Contreras
*Attorney, Agent, or Firm*—Arne I. Fors; Robert Delbridge

[57] ABSTRACT

A frame for one or for two-sided display of pictures or posters having an unique configuration and novel combination of component parts which permit quick and permanent assembly to provide a rigid frame structure for easy exchange and replacement of pictures or posters is disclosed.

The frame of the invention comprises four frame components, each frame component having an outer planar sidewall with parallel side edges, inwardly facing outer walls depending from said side wall edges substantially parallel to each other and a pair of equispaced inner walls positioned within said inwardly facing outer walls formed integral with and joined to the adjacent inwardly facing outer walls and spaced therefrom by a pair of shoulders at their respective bases to define a longitudinal recess adjacent each outer wall and to define a longitudinal slot between the inner walls, each pair of said shoulders and opposed outer side wall together defining a transverse channel for receiving a corner connector whereby the shoulders can be indented to frictionally engage the corner connector to form a rigid rectangular frame, one frame member having a longitudinal slot for insertion or removal of a picture therefrom.

The frame for single-sided viewing incorporates a clip with lug appendage for insertion into the frame construction for securement of the frame to a wall and concealment of the securing means by the picture or poster.

3 Claims, 10 Drawing Figures

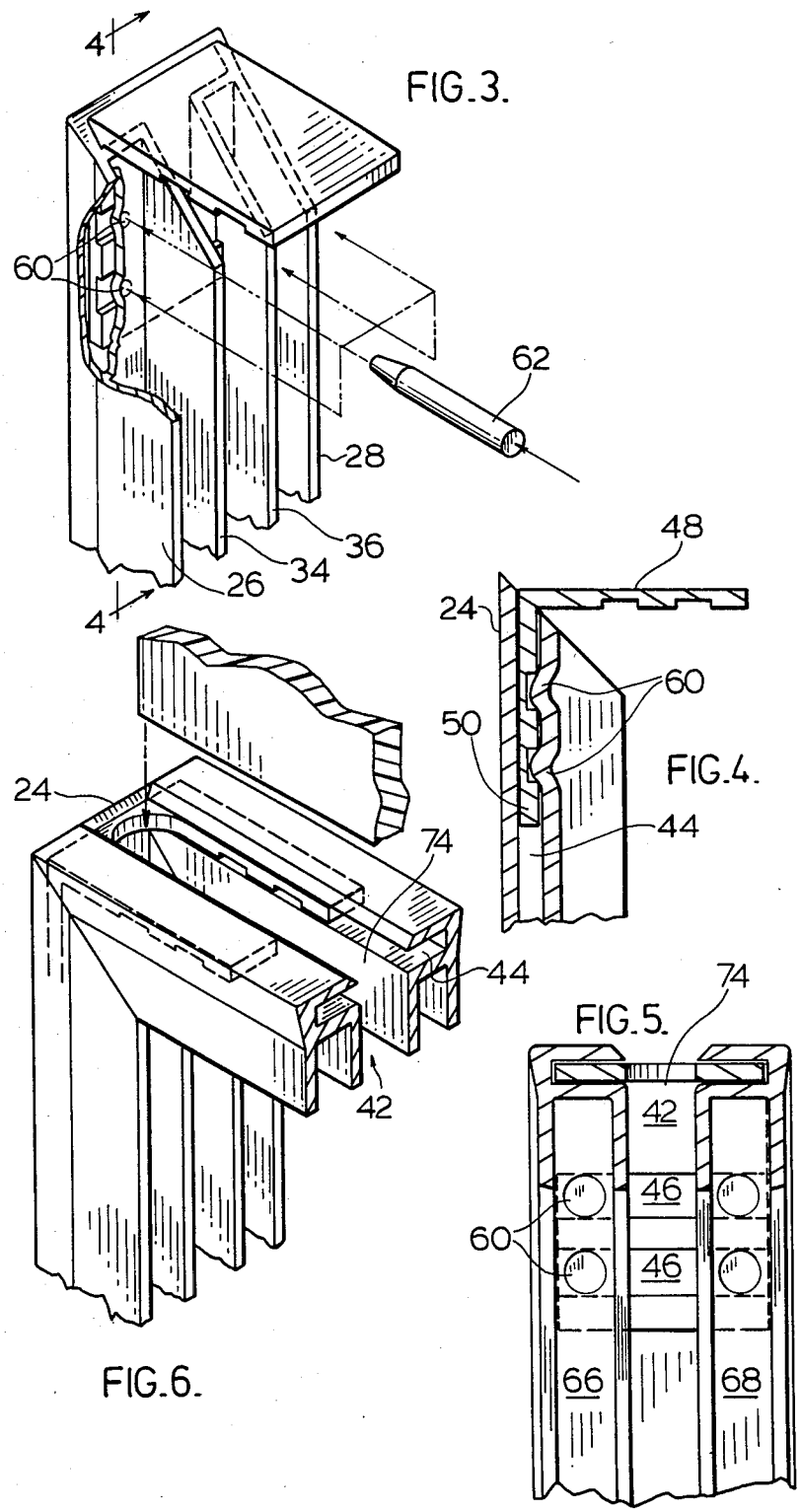

REVERSIBLE PICTURE FRAME

BACKGROUND OF THE INVENTION

This invention relates to a frame and, more particularly, relates to a frame for one or two-sided display of exchangeable pictures or posters.

Conventional frames contain pictures or posters which are intended to be viewed from one side only. Commercial posters in store and shop windows, for example, normally are hung to be viewed from the outside of the store or shop and thus present a blank surface to the interior of the establishment. An object of the present invention is to provide a picture or poster frame which can be viewed from both sides and thus present an aesthetic image or advertising message on either side.

Replacement of pictures or posters mounted in frames usually necessitates dismounting of the frames and/or release and removal of a stiff backing card from the frame. Another object of the present invention is the provision of a frame which permits facile exchange of one or a pair of pictures or posters from the top or side of the frame without removal of backing cards or disassembly of the frame.

Frames secured to or hung on walls either are mounted by means of external and visible brackets or are suspended from wires or hangers fastened to the rear of the frame. A further object of the present invention is the provision of concealed mounting means for securing a frame to a wall for one-sided viewing.

U.S. Pat. No. 3,783,543 discloses a knock-down frame for exchangeable posters. Angle connectors for holding frame components together are secured by headless screws. However, bifurcated angle connectors having a slot to permit exchange of posters cannot be secured to the adjacent frame components and the frame, especially of a large commercial size, lacks desired rigidity.

U.S. Pat. No. 3,955,298 discloses another version of a display frame having exchangeable posters which can be viewed from both sides.

STATEMENT OF THE INVENTION

The frame of the present invention for two-sided display of pictures or posters has an unique configuration and novel combination of component parts which permit quick and permanent assembly to provide a rigid frame structure for easy exchange and replacement of pictures or posters, said frame permitting viewing of the pictures or posters from both sides of the frame.

The frame of the invention, in more detail, comprises four frame components, each frame component having an outer planar sidewall with parallel side edges, inwardly facing outer walls depending from said side wall edges substantially parallel to each other, a pair of equi-spaced inner walls positioned within said inwardly facing outer walls formed integral with and joined to the adjacent inwardly facing outer wall and spaced therefrom by a pair of shoulders at their rspective bases to define a longitudinal recess adjacent each outer wall and to define a longitudinal slot between the inner walls extending to the opposed outer side walls, each pair of said shoulders and opposed outer side wall together defining a transverse channel, one of said frame members having a longitudinal slot formed substantially from one end to the other in the outer planar side wall centrally thereof co-extensive with said slot formed between the equispaced inner walls for insertion and removal of a picture therefrom, and a corner connector for insertion into the channels of adjacent frame members whereby the shoulders can be indented to frictionally engage the corner connector to form a rigid rectangular frame.

The corner connectors comprise a bracket having a pair of legs disposed at 90° to each other, said legs each having transverse recesses formed on inner faces thereof for receiving indents formed in the frame component shoulders.

The frame of the present invention for single-sided viewing incorporates a clip with lug appendage into the above frame construction for securement of the frame to a wall by means of a fastener passing through said lug into said wall.

BRIEF DESCRIPTION OF THE DRAWINGS

The frame of the invention will now be described with reference to the accompanying drawings, in which:

FIG. 3 is a perspective view of the components shown in FIG. 2 during assembly;

FIG. 4 is a section taken along line 4—4 of FIG. 3;

FIG. 5 is an inner elevation of a corner of the frame of the present invention in its assembled form;

FIG. 6 is a perspective view of the corner shown in FIG. 5 with one leg of the corner bracket bifurcated to receive a picture or poster;

DESCRIPTION OF THE PREFERRED EMBODIMENTS

Figure 2:
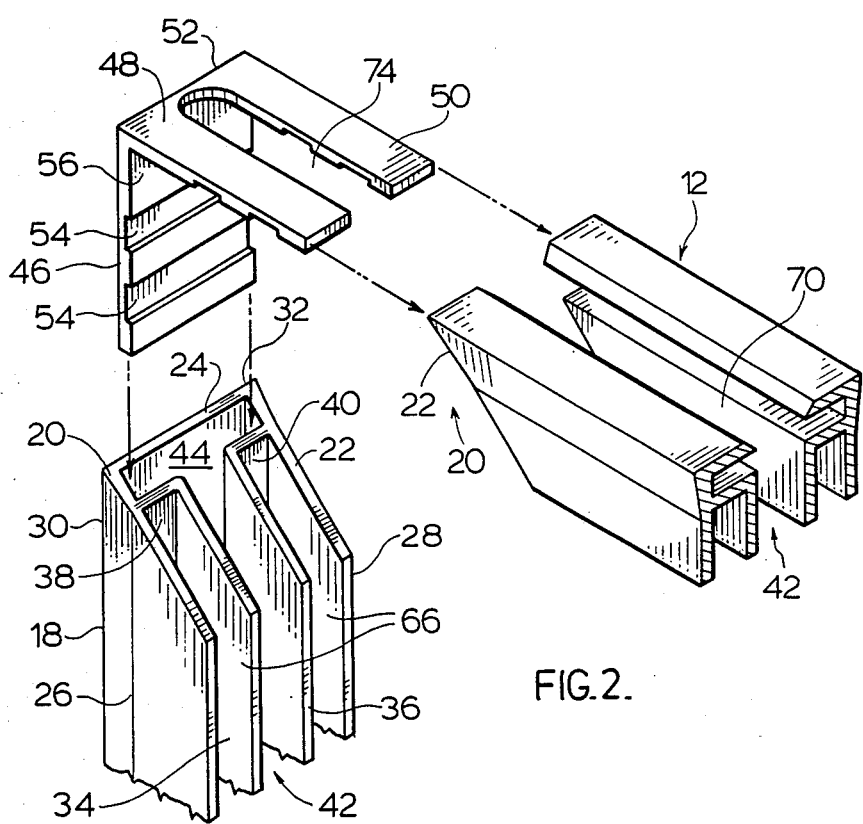
FIG. 2 is an exploded perspective view of a corner of the frame of the invention showing frame components and corner bracket in detail.

With reference now to the drawings, the frame of the present invention comprises four frame component 10, 12, 14 and 16 formed of identical lengths of extrusion designated by numeral 18 in FIG. 2 of a metal such as aluminium alloy. The corners 20 of the frame have 45° miter joints 22 for assembly together of the components as illustrated most clearly in FIG. 6.

Each of the frame components has an outer planar side wall 24 with inwardly facing outer walls 26, 28 depending from the outer side wall edges 30, 32 substantially parallel with each other and extending an equal distance inwardly. A pair of equispaced inner walls 34, 36 are formed integral with and joined to walls 26, 28 respectively by transverse shoulders 38, 40 to define a continuous longitudinal slot 42 extending therebetween to outer side wall 24.

Shoulders 38, 40 are opposed to and equispaced from outer side wall 24 and define therebetween a recess 44 which is adapted to receive a leg 46 of corner connector 48 which has a pair of legs 46, 50 secured together at their juncture 52 and disposed at 90° to each other. Leg 50 of corner connector 48 is adapted to be inserted into recess 44 of the adjacent member 12, as shown in FIG. 2 and FIGS. 4–6.

Each of connectors 48 has transverse recesses 54 formed on the inner faces 56 of the legs to receive indentations 60, as shown most clearly in FIG. 3.

A punch 62 readily permits forming of indents 60 in all frame components including upper component 12 due to the presence of recesses 66, 68 formed between walls 26, 34 and 28, 36 respectively.

Figure 7:
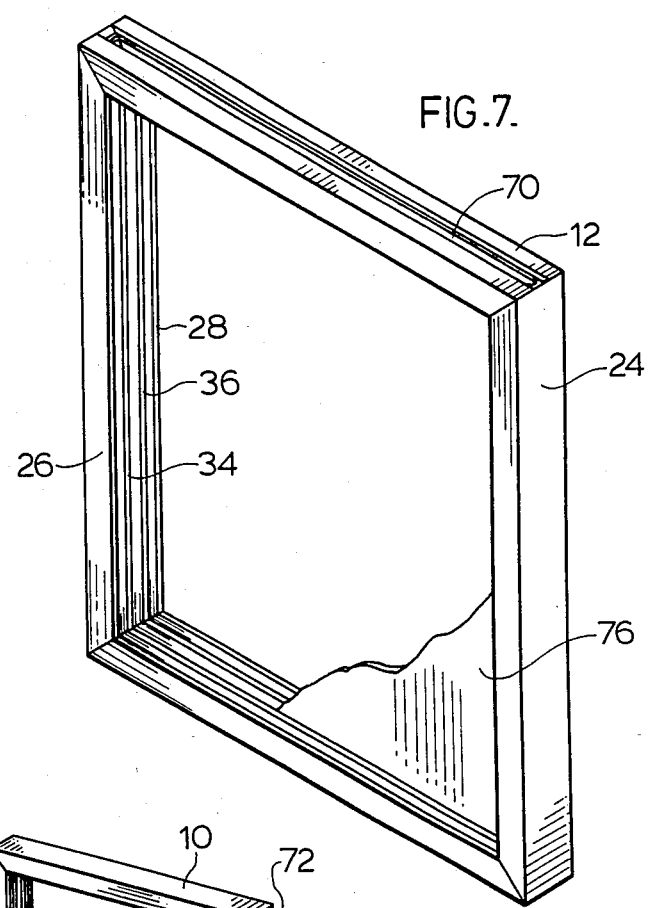
FIG. 7 is a further perspective view of the frame of the present invention showing, in more detail, the configuration of the frame components.
Figure 8:
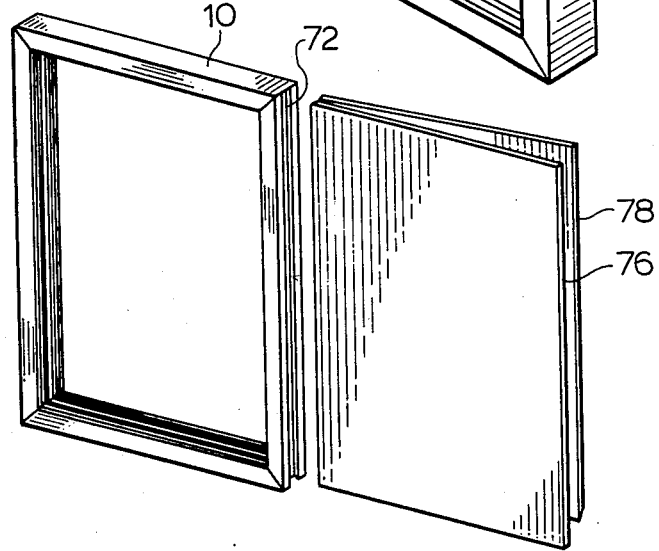
FIG. 8 is a perspective view of a frame of the invention with a slot formed in a side frame component for receiving a picture or poster.

One of the frame components has a longitudinal slot formed in outer planar side wall 24, slot 70 as shown in top frame component 12 in FIG. 7 and slot 72 as shown formed in the side frame component 10 in FIG. 8, extending substantially the length centrally of said frame components. With reference to FIG. 2, corner connector 46 has a bifurcated slot 74 formed therein in alignment with inner slot 42, as shown most clearly in FIGS. 5 and 6.

Figure 1:
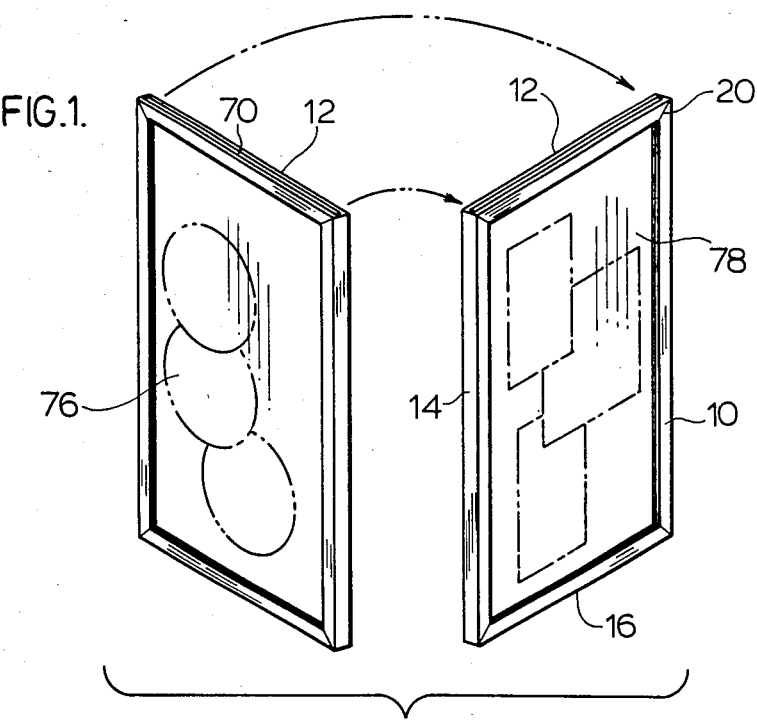
FIG. 1 is a perspective view of the frame of the present invention rotated throuqh 90° to show both sides of the frame.

FIGS. 1 and 7 show a frame of the invention having a slot 70 formed in upper frame component 12 to permit pictures 76, 78. FIG. 8 shows a slot 72 formed in the side frame component 10 for lateral insertion of pictures or posters 76, 78.

Figure 9:
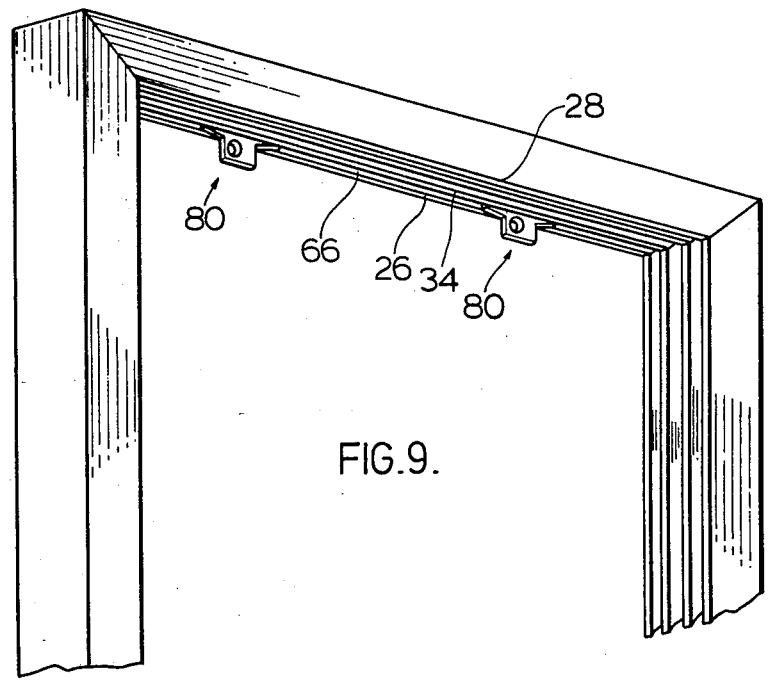
FIG. 9 is a perspective view of an embodiment of the invention with fastening means for securement to a wall.
Figure 10:
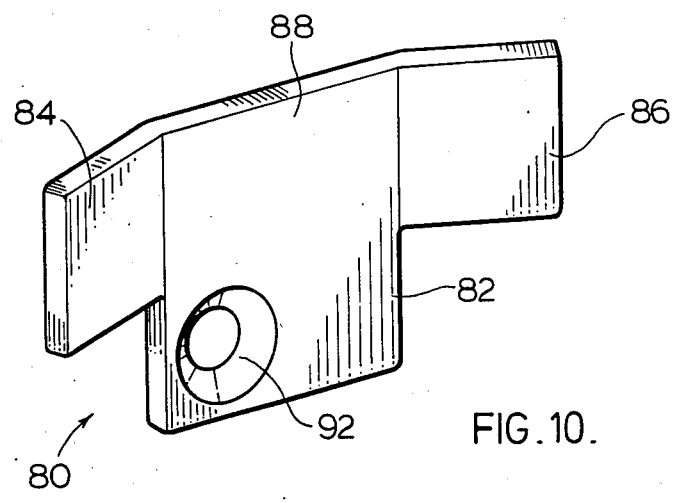
FIG. 10 is a perspective view in more detail of the dip shown in FIG. 9.

FIGS. 9 and 10 illustrate the use of a detachable clip depicted by numeral 80 adapted to be inserted into a recess 66 or 68 formed adjacent outer frame walls 26, 28 respectively. Clip 80 is formed of a spring-like material such as stiff plastic or spring steel having a central lug 82 depending upon a pair of oppositely-extending lateral wings 84, 86 which are bent out of the plane of lug 82 such that the base 88 of lug 82 will abut, for example, wall 26 of recess 66 as wings 84, 86 frictionally engage the opposite wall 34 upon insertion of clip 80 into recess 66.

A fastener such as a screw or nail 90 driven through hole 92 of clip lug 82 secures the clips and frame attached thereto to a wall. A pair of upper clips 80, together with a pair of lower clips, not shown, effectively secure large commercial signs to a wall and, upon insertion of a picture or poster advertisement, the securing means are invisible and hidden from vandals.

The structure of the present invention provides a number of important advantages. The frame components can be easily assembled by means of corner connectors secured thereto by the simple expedient of punching readily accessible channel shoulders to produce a rigid assembly. All components, including the slotted upper or side frame components, can be effectively interconnected.

The assembly permits pictures or posters to be readily exchanged and allows viewing of the frame contents from both sides of the frame. A single-sided embodiment of my invention can be secured to a supporting wall by concealed fasteners thereby thwarting vandals.

It will be understood, of course, that modifications can be made in the embodiment of the invention illustrated and described herein without departing from the scope and purview of the invention as defined in the appended claims.

What I claim as new and desire to protect by Letters Patent of the United States is:

1. A frame for two-sided or single-sided display and exchange of pictures and posters comprising, in combination, four frame components, each frame component having an outer planar sidewall with parallel side edges, inwardly facing outer walls depending from said side wall edges substantially parallel to each other, a pair of equispaced inner walls positioned within said inwardly facing outer walls formed integral with and joined to the adjacent inwardly facing outer wall and spaced therefrom by a pair of shoulders at their respective bases to define a longitudinal recess adjacent each outer wall and to define a longitudinal slot between the inner walls extending to the opposed outer side walls, each pair of said shoulders and opposed outer side wall together defining a transverse channel, one of said frame members having a longitudinal slot formed substantially from one end to the other in the outer planar side wall centrally thereof co-extensive with said slot formed between equispaced inner walls for insertion and removal of a picture therefrom, and a corner connector for insertion into the channels of adjacent frame members whereby the shoulders can be indented to frictionally engage the corner connector to form a rigid rectangular frame.

2. A frame as claimed in claim 1 in which each of said corner connectors comprises a bracket having a pair of legs disposed at 90° to each other, said legs each having transverse recesses formed on inner faces thereof for receiving indents formed in the frame component shoulders.

3. A frame as claimed in claim 1 which additionally comprises at least one detachable clip for insertion into a longitudinal recess adjacent an outer wall, said clip having a central lug and a pair of lateral wings extending therefrom adapted to frictionally engage the walls of the recess whereby said frame can be supported by a fastener passing through a hole in said lug.

* * * * *